(12) United States Patent
Bana

(10) Patent No.: US 11,019,202 B2
(45) Date of Patent: May 25, 2021

(54) METHOD, DEVICE, SYSTEM AND NETWORK FOR ROUTING COMMUNICATIONS

(71) Applicant: Hafeez Bana, London (GB)

(72) Inventor: Hafeez Bana, London (GB)

(*) Notice: Subject to any disclaimer, the term of this patent is extended or adjusted under 35 U.S.C. 154(b) by 0 days.

(21) Appl. No.: 16/326,519

(22) PCT Filed: Aug. 18, 2017

(86) PCT No.: PCT/GB2017/052458
§ 371 (c)(1),
(2) Date: Feb. 19, 2019

(87) PCT Pub. No.: WO2018/033755
PCT Pub. Date: Feb. 22, 2018

(65) Prior Publication Data
US 2019/0230216 A1    Jul. 25, 2019

(30) Foreign Application Priority Data
Aug. 18, 2016 (GB) .................................. 1614165

(51) Int. Cl.
*H04W 4/00* (2018.01)
*H04M 3/42* (2006.01)
(Continued)

(52) U.S. Cl.
CPC .......... *H04M 3/4228* (2013.01); *H04L 12/14* (2013.01); *H04L 12/1403* (2013.01); *H04M 3/44* (2013.01);
(Continued)

(58) Field of Classification Search
CPC .. H04M 3/4228; H04M 7/1285; H04L 45/745
See application file for complete search history.

(56) References Cited

U.S. PATENT DOCUMENTS 9,129,118 B1 * 9/2015 Johansson ........... G06F 21/6227
2004/0179527 A1 * 9/2004 Cypher ................. H04L 1/0061
370/392
(Continued)

FOREIGN PATENT DOCUMENTS

WO    WO-2012100751 A1 *  8/2012    ............ H04W 28/06

OTHER PUBLICATIONS

International Search Report for PCT/GB2017/052458, dated Oct. 26, 2017, 3 pages.
(Continued)

*Primary Examiner* — Omoniyi Obayanju
(74) *Attorney, Agent, or Firm* — Nixon & Vanderhye, P.C.

(57) ABSTRACT

The present invention relates to a method for routing communications in a telecommunications network comprising a first telephony user device and a server system. The method includes at the first telephony user device: receiving instructions to initiate communications with a contact associated with an address; initiating communications via a channel within the telecommunications network to a local address for the server system; and transmitting information associated with the contact address to the server system via the telecommunications network. A communications action is performed in relation to the contact at the server system. Other methods, devices, systems and networks for routing communications are disclosed.

33 Claims, 12 Drawing Sheets

(51) Int. Cl.
*H04M 7/12* (2006.01)
*H04M 7/00* (2006.01)
*H04M 15/00* (2006.01)
*H04L 12/14* (2006.01)
*H04M 3/44* (2006.01)

(52) U.S. Cl.
CPC ......... *H04M 7/003* (2013.01); *H04M 7/1285* (2013.01); *H04M 15/00* (2013.01); *H04M 15/63* (2013.01); *H04M 15/8044* (2013.01); *H04M 2203/2011* (2013.01); *H04M 2203/558* (2013.01); *H04M 2203/60* (2013.01); *H04M 2203/652* (2013.01); *H04M 2215/745* (2013.01); *H04M 2242/30* (2013.01); *H04M 2242/40* (2013.01)

(56) References Cited

U.S. PATENT DOCUMENTS

| | | | |
|---|---|---|---|
| 2010/0226362 A1* | 9/2010 | Kim | H04L 12/14 370/352 |
| 2010/0227604 A1* | 9/2010 | Hsieh | H04M 15/7652 455/418 |
| 2013/0281057 A1 | 10/2013 | Bender et al. | |
| 2014/0206403 A1* | 7/2014 | Buckley | H04W 4/14 455/466 |
| 2015/0222754 A1* | 8/2015 | Ramprasad | H04W 40/20 455/417 |

OTHER PUBLICATIONS

Written Opinion of the ISA for PCT/GB2017/052458, dated Oct. 26, 2017, 6 pages.

* cited by examiner

METHOD, DEVICE, SYSTEM AND NETWORK FOR ROUTING COMMUNICATIONS

This application is the U.S. national phase of International Application No. PCT/GB2017/052458 filed 18 Aug. 2017, which designated the U.S. and claims priority to GB Patent Application No. 1614165.7 filed 18 Aug. 2016, the entire contents of each of which are hereby incorporated by reference.

FIELD OF INVENTION

The present invention is in the field of telecommunications. More particularly, but not exclusively, the present invention relates to routing communications in a telecommunications network.

BACKGROUND

In general, subscribers to a telecommunications network are provided with telecommunications services, such as connecting calls from their telephony device to other telephony devices, via the public switched telephone network (PSTN). The PSTN is the aggregate of the world's circuit-switched telephone networks that are operated by national, regional, or local telephony operators. The PSTN consists of telephone lines, fibre optic cables, microwave transmission links, cellular networks, communications satellites, and undersea telephone cables, all interconnected by switching centres. To interact within the PSTN, a telephony device for a subscriber initiates communication with another telephony device or other end point, typically, via a telephone number for the other telephony device or other end point. The telephone number is a sequence of digits that correspond to an end point within the PSTN. A full telephone number includes an international dialing prefix; a country code; an area code, mobile network prefix, or service dialing code; and a subscriber number. Communications routed by the PSTN to the end point for the telephone number are often billed to the subscriber. Costs for the billing are often dependent on the length of the telephone call or nature of the communication, and/or whether the communication is routed internationally, out of the subscriber's current network, and/or to a telephone number with a special dialing code.

It would be desirable if subscribers to a telecommunications network were provided with alternative methods for routing their communications.

One common alternative for communications routing involves the use of a virtual calling card. A virtual calling card provides a local number for the subscriber to call. During the call, the subscriber can then provide the telephone number with which they wish to be connected. A server system to which the local number is connected then routes the call. The advantages of this system are that the server system can use alternative routing methods such as via an IP (Internet Protocol) network. The disadvantages of this system include that it is cumbersome for the subscriber to utilise, it is inflexible, and it may be vulnerable to hacking.

It is an object of the present invention to provide a method and system for routing communications in a telecommunications network which overcomes the disadvantages of the prior art, or at least provides a useful alternative.

SUMMARY OF INVENTION

According to a first aspect of the invention there is provided a method for routing communications in a telecommunications network comprising a first telephony user device and a server system, including:

at the first telephony user device:
  receiving instructions to initiate communications with a contact associated with an address;
  initiating communications via a channel within the telecommunications network to a local address for the server system; and
  transmitting information associated with the contact address to the server system via the telecommunications network
wherein a communications action is performed in relation to the contact at the server system.

According to a second aspect of the invention there is provided a method for routing communications in a telecommunications network comprising a first telephony user device and a server system, including:

at the server system:
  receiving an initiation of communications from the first telephony user device via a channel within the telecommunications network to a local address for the server system; and
  receiving information associated with an address from the telephony user device via the telecommunications network; and
  performing a communications action in relation to a contact associated with the address;
wherein the first telephony user device initiates communications with the contact associated with the address.

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides a method and system for routing communications in a telecommunications network.

The inventor has discovered that communications to be transmitted to addresses, such as calls to telephone numbers, may be automatically and algorithmically redirected at the telephony user device to a server system which can then route the communications to their end-point. The inventor has discovered that this may provide the ability to re-route communications via alternative channels and/or route communications to end-points whose telephone numbers are unknown to the telephony user device.

Figure 1:
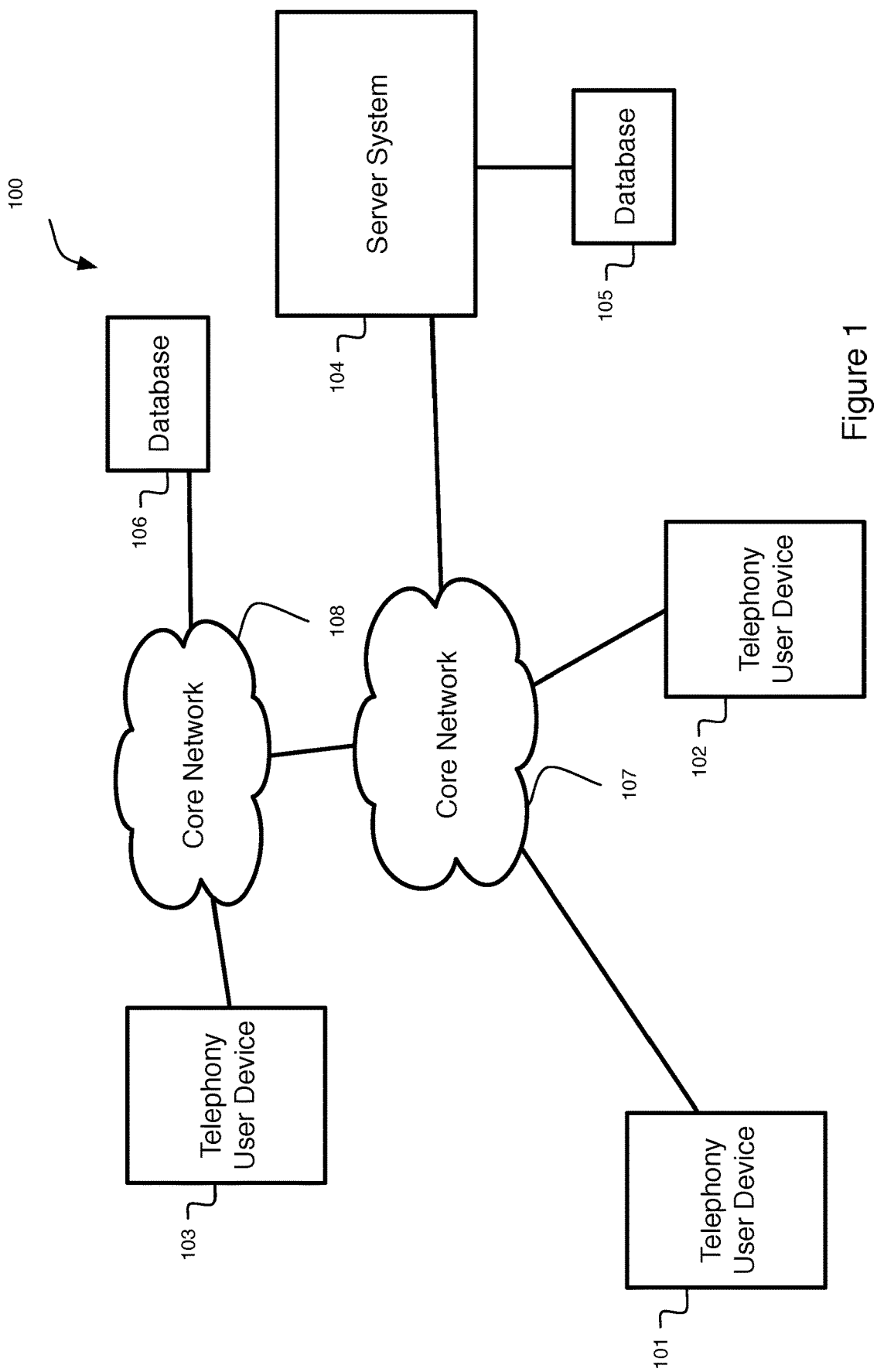
FIG. 1: shows a block diagram illustrating a telecommunications network in accordance with an embodiment of the invention.

In FIG. 1, a telecommunications network 100 in accordance with an embodiment of the invention is shown.

The telecommunications network 100 may be a public switched telephone network (PSTN).

The telecommunications network 100 includes one or more telephony user devices 101, 102, and 103. It will be appreciated that the telephony user devices 101, 102, and 103 may be fixed line telephones or telephonic systems, or mobile telephonic devices such as mobile phones or smartphones. Each telephony user device 101, 102, and 103 may be associated with one or more unique identifiers within the telecommunications network 100 such as an IMSI (International Mobile Subscriber Identity).

The telecommunications network 100 includes a server system 104. The telecommunications network 100 may include one or more databases 105 and 106.

The telecommunications network 100 may include one or more core networks 107 and 108 configured for routing communications between end-points such as the telephony user devices 101, 102, and 103 and the server system 104.

At least one of the telephony user devices 101, 102, and 103 may be configured for receiving an initiation of communications to a contact associated with an address. The address may be, for example, a telephone number such as telephone assigned under the E.164 numbering plan or a SIP address.

At least one of the telephony user devices 101, 102, and 103 may be configured to initiate communications with the server system 104 via a local address and transfer information to the server system 104 related to the contact. The local address may be, for example, a telephone number assigned under the E.164 numbering plan or a SIP address. The local address may be selected from a plurality of local addresses.

The server system 104 may be configured for receiving the initiation of communications from a telephony user device 101, 102, or 103 and information relating to a contact via the local address. The server system 104 may be configured for retrieving an address for the contact from a lookup table stored on one or more of the databases 105 or 106. The server system 104 may be configured for performing a communications action in relation to the contact, for example, using the retrieved address or a second address mapped to by the retrieved address. The communications action may include routing communications from the telephony user device 101, 102, or 103 to a telephony user device (such as 101, 102, or 103) corresponding to the retrieved or second address.

Figure 2:
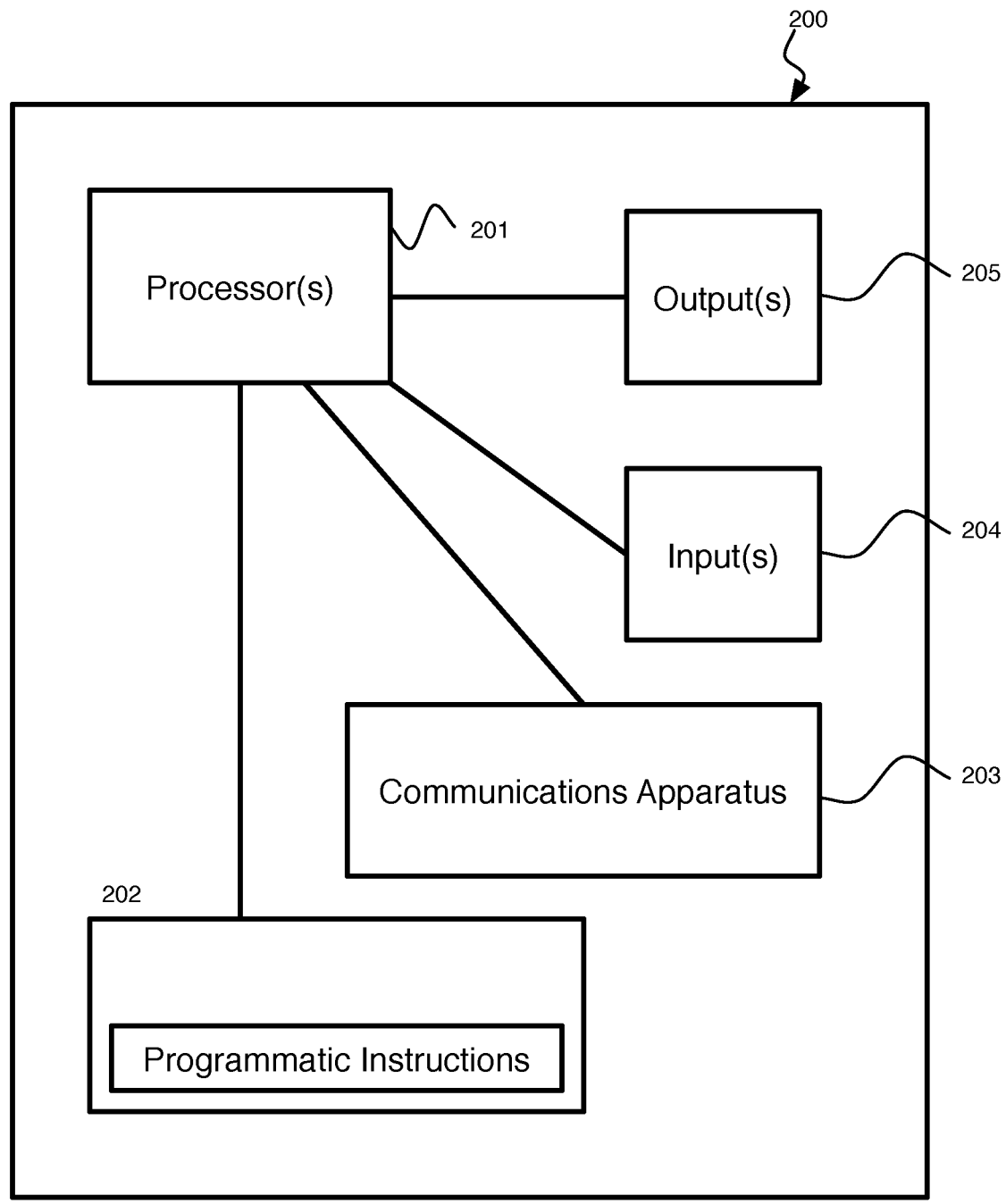
FIG. 2: shows a block diagram illustrating a telephony user device in accordance with an embodiment of the invention.

FIG. 2 shows a telephony user device 200 (such as 101, 102, or 103) in accordance with an embodiment of the invention.

The telephony user device 200 may include one or more processors 201, a memory 202, a communications apparatus 203, one or more user input devices 204 and one or more user output devices 205. For example, the one or more input devices 204 may include a microphone, a camera, a touch/near touch-sensitive input such as a touch-screen, pointer device, such as a mouse, and/or one or more buttons, and the one or more output devices 205 may include an electronic display, a speaker, and/or a haptic feedback device. The communications apparatus 203 may be a cellular communications module such as 1G, 2G, 3G, and/or 4 g/LTE, wifi, Bluetooth or Zigbee, or a wired communications module such as Ethernet or a telephonic landline module. The communications apparatus 203 may be configured to transmit and receive communications within a telecommunications network (such as 100).

The memory 202 may be configured to store programmatic instructions. The programmatic instructions when executed on the one or more processors 201 may be configured to provide receive instructions to initiate communications with a contact associated with an address. The programmatic instructions may receive instructions from a user via a user interface provided by the programmatic instructions on the one or more display devices 204, or the instructions may be intercepted from an application (such as a dialer) executing on the one or more processors 201.

The programmatic instructions may be further configured to initiate communications with a server system (such as 104) via the communications apparatus 203. The programmatic instructions may initiate communications via a local address which may be selected from a plurality of addresses for the server system (e.g. 104).

The programmatic instructions may be further configured to transmit information associated with the contact address to the server system (e.g. 104) via the communications apparatus 203. The information may be, at least part of, the address (in plain form or encrypted), or an index to the address.

The programmatic instructions may be implemented within a software application executing within an operating system on the telephony user device 200 or within the operating system itself. It will be appreciated that the programmatic instructions may be implemented in alternative deployments, such distributed across multiple applications, partially application/partially OS, and entirely within hardware.

Figure 3:
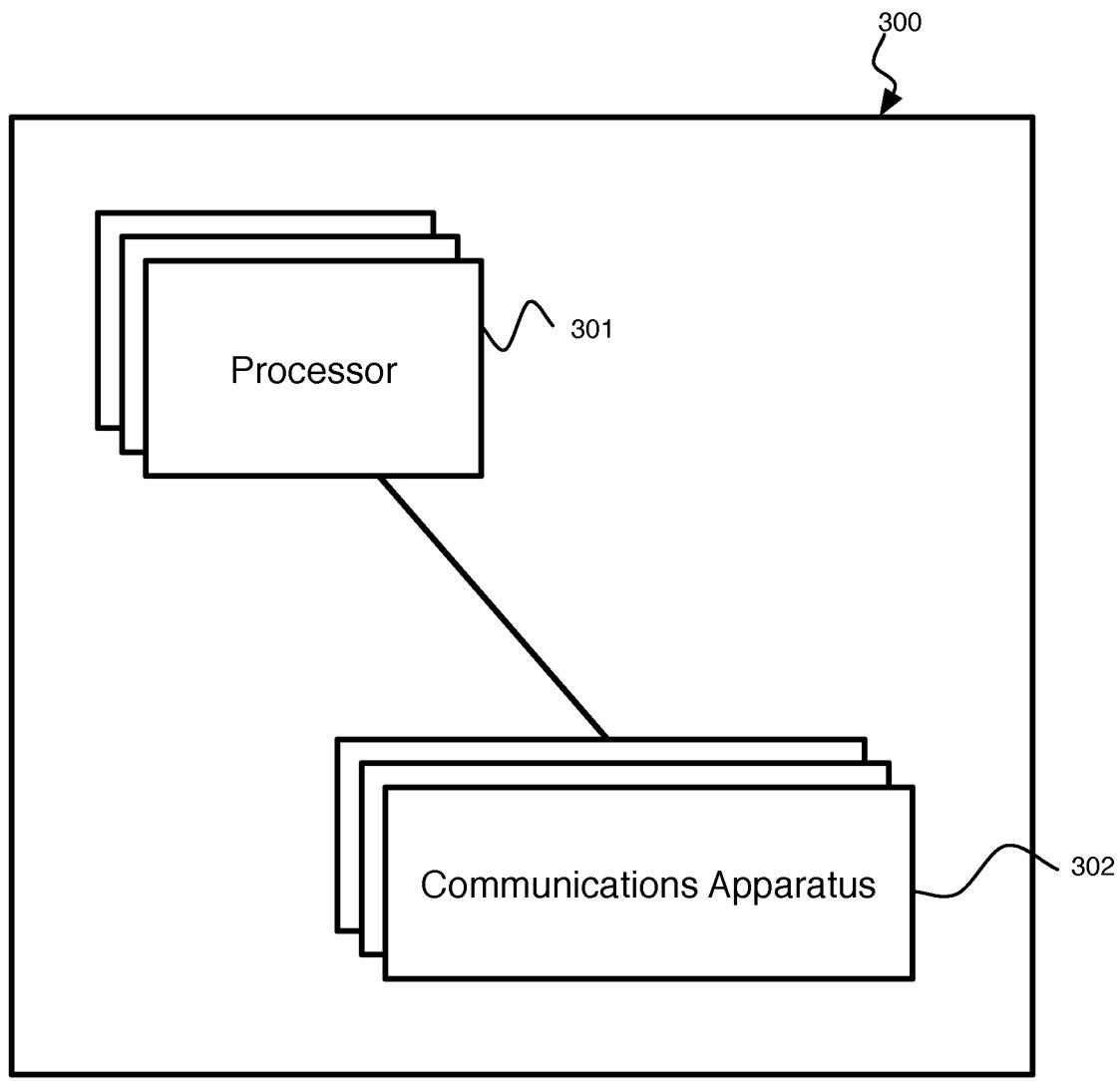
FIG. 3: shows a block diagram illustrating a server system in accordance with an embodiment of the invention.

FIG. 3 shows a server system 300 (such as 104) in accordance with an embodiment of the invention.

The server system 300 may include one or more processors 301, and one or more communication apparatuses 302.

The server system 300 may be configured to execute programmatic instructions on the one or more processors 301. The programmatic instructions may be configured to perform the method described in relation to FIG. 6.

Figure 4:
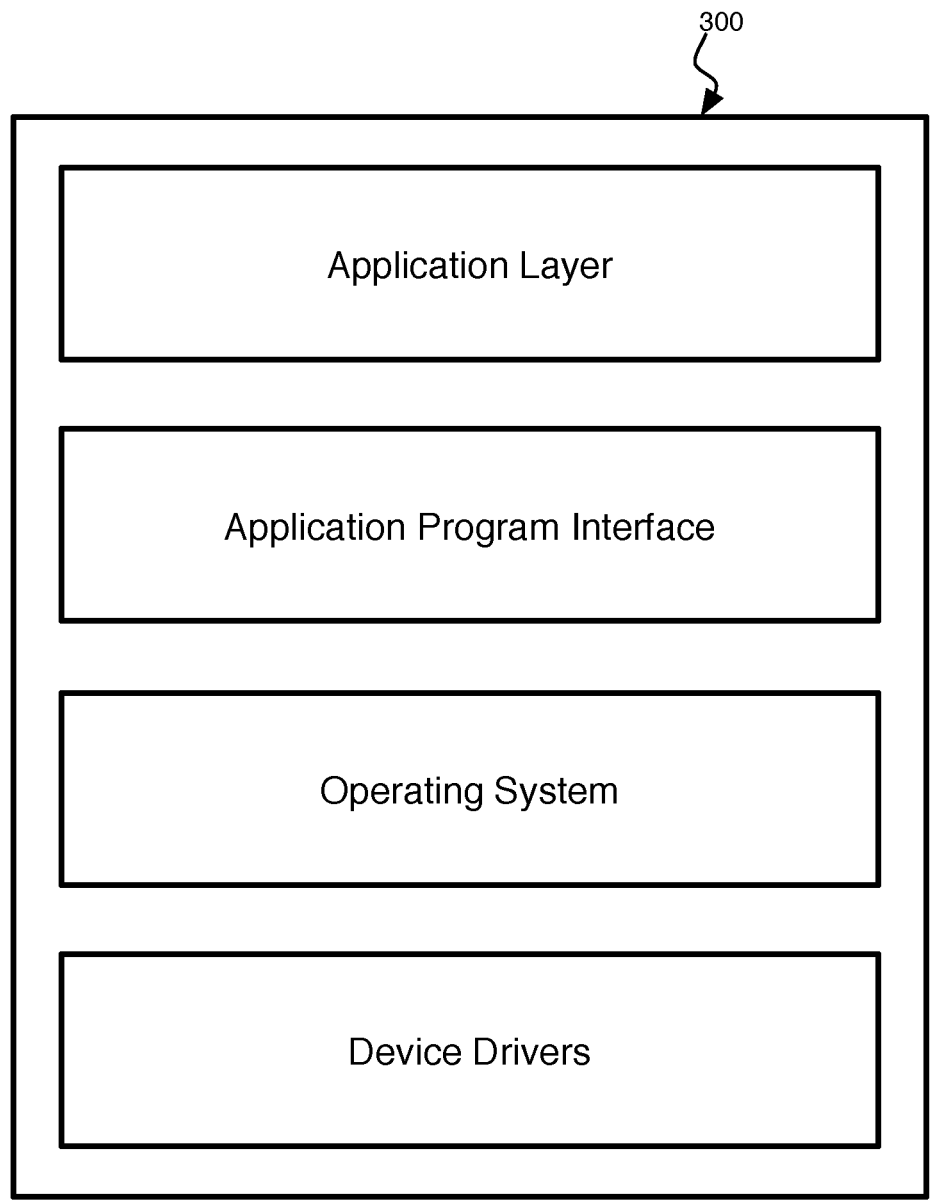
FIG. 4: shows a block diagram illustrating a software architecture for a telephony user device in accordance with an embodiment of the invention.

FIG. 4 shows a software architecture for a telephony user device (such as 101, 102, 103, and/or 200) in accordance with an embodiment of the invention.

The architecture includes a device driver layer, an operating system layer, an application program interface (API) layer, and an application layer.

The programmatic instructions described in relation to FIG. 2 may reside within the application layer or the operating system layer. The programmatic instructions may intercept instructions to initiate communications from another application via the API layer.

Figure 5:
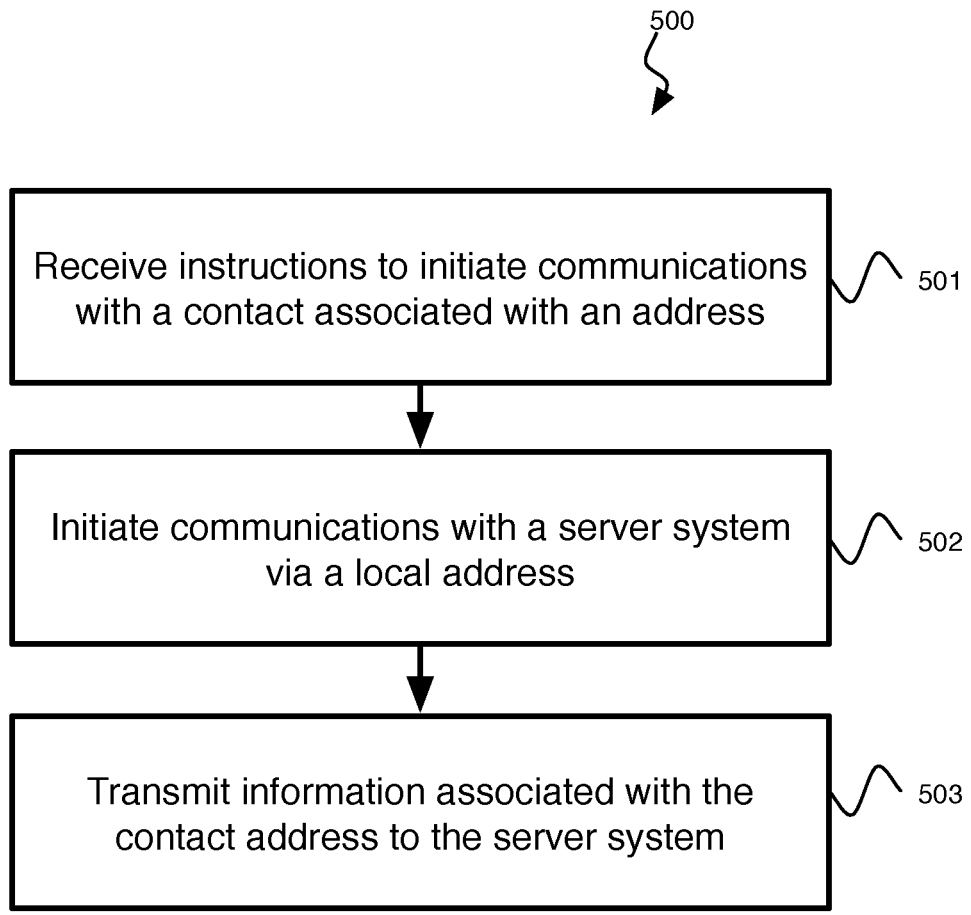
FIG. 5: shows a flow diagram illustrating a method for routing communications in accordance with an embodiment of the invention.

FIG. 5 shows a method 500 for routing communications within a telecommunications network (e.g. 100) in accordance with an embodiment of the invention.

In step 501, instructions are received at a telephony user device (e.g. 200, 101, 102, or 103) to initiate communications with a contact. The contact is associated with address. For example, the address may be a telephone number, a SIP (Session Initiation Protocol) address, or another means for identifying an end-point in the telecommunications network. The contact may be a person or it may be an entity. The instructions may be received from a user of the telephony user device via, at least, one user input device (e.g. 204) at the telephony user device. A user interface may be provided by an application executing at the telephony user device via one or more user input devices (e.g. 204) and one or more user output devices (e.g. 205) to receive instructions from the user. The user interface may be provided via a default application for the telephony user device, such as a dialer, via a third party application for the telephony user device, or via any other native application for the telephony user device. In one embodiment, the application may generate commands to the operating system to initiate communications with the contact via a communications apparatus (e.g. 203) at the telephony user device. In this embodiment, the commands may be intercepted. The commands may be intercepted at the operating system layer (for example, as shown in FIG. 4) under direction of a second application.

To intercept dialer commands in the Android operating system a Broadcast Receiver Object is registered and the associated object requested in the manifest file for the second application to handle outgoing calls.

When this is done—when the user dials a phone number within a dialer, all registered Broadcast Receivers will receive the event with the dial data and are able to execute a number of actions such as showing new dialogs or altering information such as the dial string that will eventually be dialed by the system dialer.

Exemplary code for performing interception on the Android operating system is shown below:

```
import android.content.BroadcastReceiver;
import android.content.ComponentName;
import android.content.Context;
import android.content.Intent;
import android.telephony.PhoneNumberUtils;
import com.dialler.DiallerUtils
import java.util.Map;
public class OutgoingCallHandler extends BroadcastReceiver {
    private Context context;
    public static String ignoreNext = "";
    @Override
    public void onReceive(Context aContext, Intent intent) {
        context = aContext;
        String action = intent.getAction( );
            String number = getResultData( );
            if (number == null) {
                return;
            }
            if(LeduniaUtils.isEmergencyNumber(number)) {
                ignoreNext = "";
                setResultData(number);
                return;
            }
            if(!Intent.ACTION_NEW_OUTGOING_CALL.equals(action)) {
                setResultData(number);
            return;
            }
            // So this is a valid trigger. Now check if this number matches the condition
            // to take action, If so then run the code to translate the number to a local number
            // e.g. dialling +255799344344 would translate to depending on if you were in the UK
            // to +442082087777;799344344
            if (action.equals(Intent.ACTION_NEW_OUTGOING_CALL) ) {
                if (DiallerUtils.isMatchingNumber(number)) {
                    setResultData(DiallerUtils.TranslateToLocalBridge(number));
                }
                return;
            }
            setResultData(number);
            return;
    }
}
```

To intercept dialer commands in the iOS operating system, a CallKit API is provided which allows third party apps to integrate with the system dialer and contacts.

The second application may then implement an intent to handle INStartAudioCallIntent intents and on matching of an appropriate contact—register itself as capable of handling the dial event.

It will be appreciated that, although the above are exemplary methods that are applicable to only two operating systems for mobile communications devices, similar methods could be used to intercept dialer commands within other operating systems and other devices.

The communications may be a voice call, an SMS or MMS, a SIPP message, or another network message.

In one embodiment, the address is stored at the telephony user device. For example, within a phonebook.

In step 502, communications are initiated between the telephony user device and a server system (e.g. 104 or 300) via a channel within the telecommunications network. Communications are initiated using a local address for the server system. The local address may be selected by the telephony user device from a plurality of addresses for the server system. The plurality of addresses may include a plurality of local addresses for the server system. A local address may be an address that is a non-international, local area, within-network, and/or non-special number. The communications may be initiated, for example, by the second application after the interception of the commands. The communications may be initiated over a voice channel, SMS channel, IP channel, and/or data channel.

In one embodiment, a query message may be displayed on the telephony user device. The query message may indicate that the contact can be communicated with via an alternative method and/or via a regular method, and provide the option to confirm the method to the user. Only when the user selects the alternative method are communications initiated between the telephony user device and the server system. In one embodiment, the query message may not be displayed and the decision to initiate communications between the telephony user device and the server system may be made algorithmically at the telephony user device. For example, if the address is out of network, international or a special number.

In one embodiment, the telephony user device may determine which of the plurality of addresses are local addresses using a location determination method. The location determination method may include using GPS or A-GPS, analysing local wifi SSIDs, extracting and analysing SIM information for the telephony user device (e.g. IMSI), detecting which network carrier the telephony user device is attached to, or a combination of any of the preceding. Once the telephony user device has determined its own location, it may then determine which of the plurality of addresses for the server system are local to it.

In step 503, information associated with the address for the contact is transmitted by telephony user device to the server system via the telecommunications network. The information may be transmitted over the channel or over a side-channel. For example, in relation to transmission over the channel, where the channel is a voice channel, the information may be passed as dial tones after communications are initiated with the server system. For example, in relation to transmission of information over a side-channel, where the channel is a voice channel, the information may be transmitted over an SMS or IP channel prior to, during, or after initiation of communications with the server system. The information may include at least a part of the address for the contact. The information, or at least a part of it, may be encrypted, for example, by an encryption function which may include XOR. An incrementing function may be used to encrypt the information. Further examples of encryption will be described later in relation to FIGS. 9 and 10.

In one embodiment, the information includes action information which specifies, at least in part, the type of communications action that the server system is to take.

The server system then performs a communications action in relation to the contact. Further detail will be provided later in relation to FIG. 6.

In one embodiment, the telephony user device and the server system synchronise addresses for one or more contacts stored at the telephony user device with the server system. Further detail will be provided later in relation to FIG. 10.

Embodiments of the method described above may be implemented within the programmatic instructions described in relation to FIG. 2.

Figure 6:
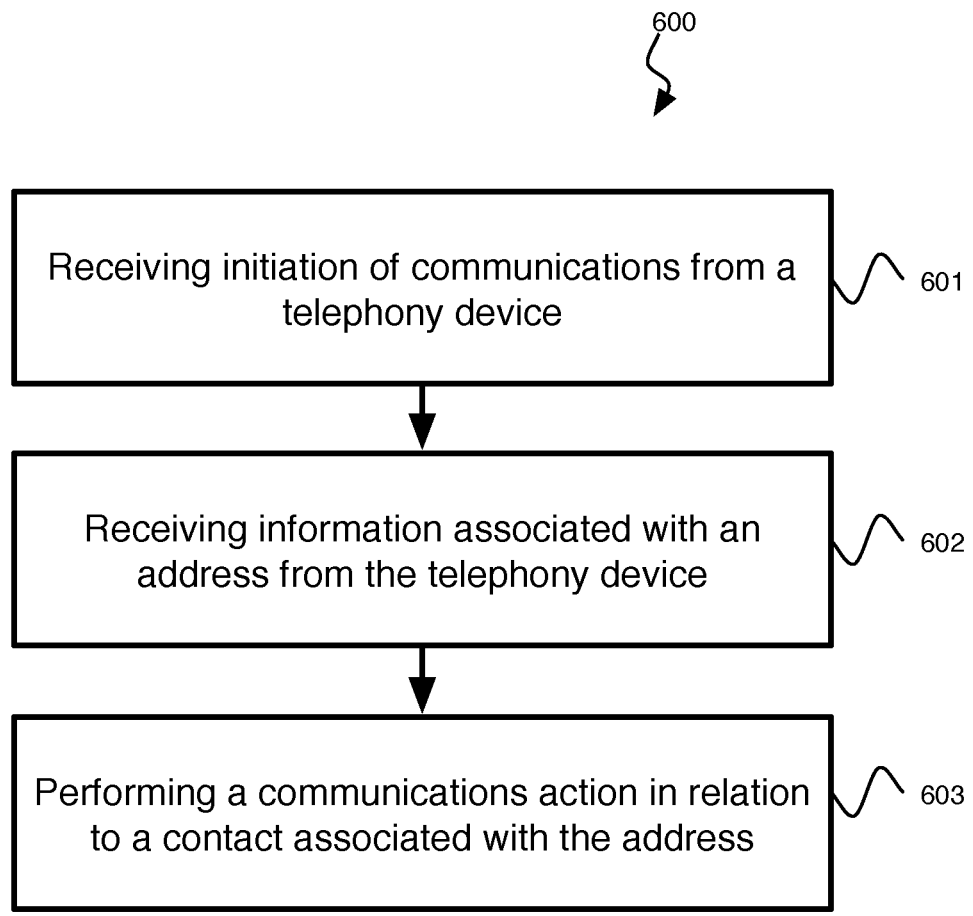
FIG. 6: shows a flow diagram illustrating a method for routing communications in accordance with an embodiment of the invention.

FIG. 6 shows a method 600 for routing communications within a telecommunications network (e.g. 100) in accordance with an embodiment of the invention.

In step 601, a server system (e.g. 104 or 300) receives initiation of communications to a contact from a telephony user device (e.g. 101, 102, 103, or 200) via a channel within the telecommunications network. The communications may be initiated over a voice channel, SMS channel, IP channel, and/or data channel. The communications may be initiated via a local address for the server system. The server system may be associated with a plurality of addresses, and the plurality of addresses may include a plurality of local addresses.

In step 602, the server system receives information associated with an address from the telephony user device via the telecommunications network. The information may be transmitted over the channel or over a side-channel. For example, where the channel is a voice channel, the information may be transmitted over an SMS or IP side-channel. The information is associated with the contact. The information may be the address for the contact or encode at least part of the information for the address.

The information may include, at least part of, an index for the address within a lookup table. The lookup table may be stored at one or more databases (e.g. 105 or 106). The databases may be accessible to the server system.

The information may include action information which specifies a type of communications actions for the server system to perform.

In step 603, the server system may perform a communications action in relation to the contact. The server system may obtain the address for the contact using the information. For example, where the information encodes or encrypts, at least part of, the address, the information may be decoded or decrypted to retrieve, at least part of, the address. Where only a part of the address is retrieved from the information, the remainder of the address may be obtained from other sources. In one embodiment, selection of the local address for the server system by the telephony user device may provide part of the address as later described in relation to FIG. 8b.

In one embodiment, the server system may retrieve the address for the contact via an index-address lookup table. Further detail will be provided later in relation to FIGS. 7 and 8a.

Figure 11:
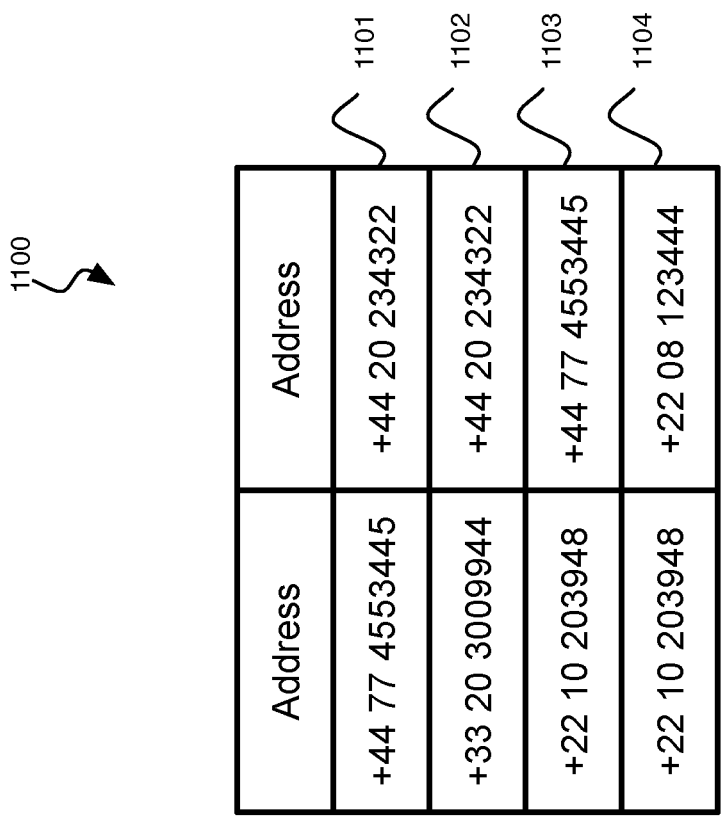
FIG. 11: shows a table illustrating a local addresses list for use with an embodiment of the invention.

The communications action may include connecting the channel between the telephony user device and the end-point associated with the address. The end-point may be at a second telephony user device. In one embodiment, the end-point may be addressable within the telecommunications network via the address. In one embodiment, the end-point may be addressable within the telecommunications network via a second address. In this embodiment, the first address may be mapped directly to the second address or via intermediary addresses; and the first address may be mapped to the second address via an address-to-address lookup table (as shown in FIG. 11) accessible by the server system. In this embodiment, it can be seen that communications to a first address which may be known to the telephony user device may be routed to a second address unknown to the telephony user device.

The communications action may include generating one or more prompts (such as audio prompts) for delivery to the telephony user device and/or receiving one or more selections (such as tones) from the telephony user device. For example, the prompts may include the per-minute costs expected for a voice-call, and the selections may include actuate a connection to the end-point at the specified per-minute costs.

The communications action may include initiating communications with the telephony user device and with the end-point associated with the address, and connecting both via a new channel.

The communications action to take may be determined by action information within the information received by the server system.

In one embodiment, where the communications action includes initiating communication with the telephony user device and the end-point associated with the address, the server system may route communications to the end-point as if they originate from an address associated with the telephony user device. The originating address may be selected based upon the end-point. For example, the originating address may be selected based upon the home network for the end-point (i.e. if the end-point is an IMSI with Vodafone-UK as the home network, the originating address may be defined as a Vodafone-UK telephone number). In this way, the end-point may utilise the originating address to contact the telephony user device during a subsequent communications event (e.g. if a second telephony user device at the end-point wishes to communicate with the first telephony user device) using an in-network communication.

In one embodiment, the originating address may be usable by other telephony devices to access the telephony user device via a standard routing method, for example, via the core network of a mobile network operator. In an alternative embodiment, communications to the originating address may be routed via the server system.

Figure 7:
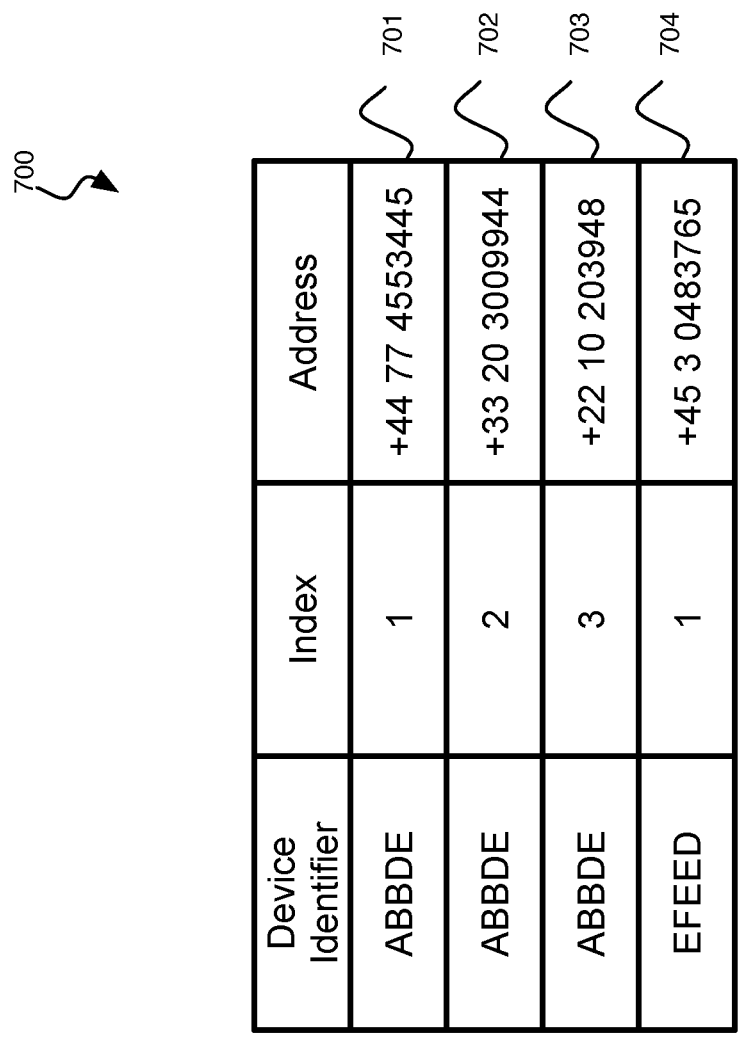
FIG. 7: shows a table illustrating an index-address lookup table for use with an embodiment of the invention.

FIG. 7 shows an exemplary index-to-address lookup table 700 for use with one or more of the embodiments described above.

In some embodiments of the invention, the address for the contact may be stored within a lookup table within one or more databases (e.g. 105 or 106) accessible to the server system (e.g. 104 or 300).

The address may be indexed within the lookup table, at least in part, by the information received from the telephony user device (e.g. 101, 102, 103, or 200). The address may be indexed within the lookup table, at least in part, by an identifier for the telephony user device. In this way, for example, a sequence of index numerals could be utilised by each originating telephony user device.

Within FIG. 7, row 701 of the table 700 includes an identifier for a first telephony user device (ABBDE), an index number 1, and an address, namely a telephone number +44 77 4553445. The address can be retrieved from the table 700 using the identifier for the originating telephony user device and an index number extracted from information transmitted by the originating telephony user device. Rows 702 and 703 relate to the same telephony user device, and row 704 relates to a different telephony user device with identifier EFEED.

In one embodiment, at least part of the lookup table is populated via a side-channel by the telephony user device. For example, the address may be transmitted via an SMS channel or IP channel. In one embodiment, a plurality of addresses may be transmitted via the side-channel prior to initiation of communications with the server system by the telephony user device. For example, the lookup table may be initially populated by the telephony user device, when the second application is configured on the telephony user device. The plurality of addresses may be extracted from a contacts list on the telephony user device. In one embodiment, the contacts list and the lookup table may be synchronised via the side-channel every time a contact address is added, modified, or deleted, and/or periodically. For example, if a new contact is added, the address for that contact may be transmitted to the server system via the side-channel along with, at least, a partial index to the address within the lookup table.

In one embodiment, at least part of the lookup table is populated by a memory protocol. The memory protocol may include the telephony user device flagging if an address has been transmitted to the server system in prior communications sessions, and if so, transmitting information to server system which corresponds, at least in part, to the index to the address within the lookup table in subsequent communications sessions. In this way, where the index to the address is one of a sequence of index numerals, less information is required to be transmitted to the server system.

In one embodiment, at least part of the lookup table is populated by a secondary device. For example, the user of the telephony user device may use another user device, such as a computer, to provide address information. In yet another example, the secondary device may be a third party server to which the user provides the server system with access (e.g. a server maintaining a list of contacts and addresses). In yet another example, the secondary device is a server or database containing contact and address information. In this embodiment, the telephony user device may not need to contain addresses. This may, therefore, increase the security or privacy of addresses for contacts.

It will be appreciated that the term address, as used above, includes outputs from reversible functions (such as encryption functions described in relation to FIGS. 9 and 10 below) which take the address as input.

Figure 8A:
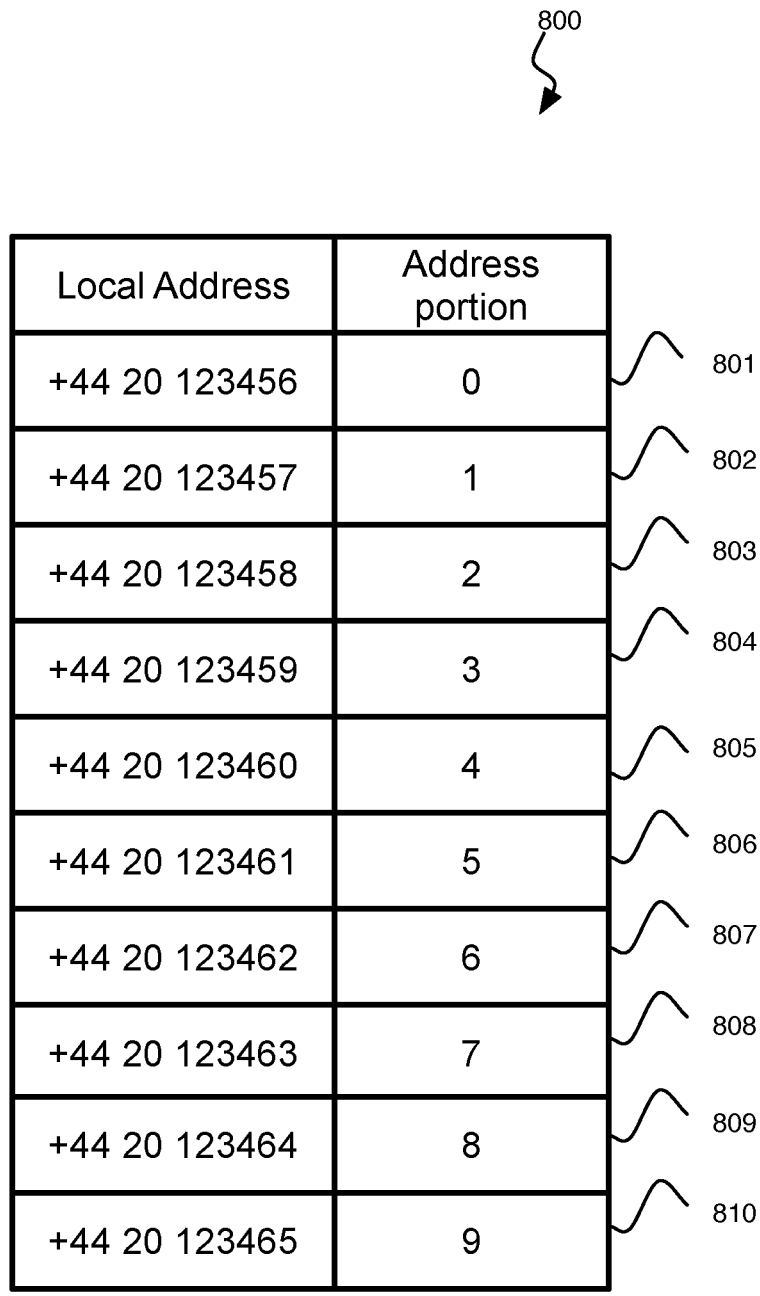
FIG. 8a: shows a table illustrating a local addresses list for use with an embodiment of the invention.

FIG. 8a shows an exemplary list 800 of local addresses for a server system (e.g. 104 or 200) for use with embodiments of the invention.

In some embodiments of the invention, at least a part of the address a contact may be comprised of selection of one of a plurality of local addresses for the server system.

For example, in FIG. 8a, rows 801 to 810 represent addresses (specifically, telephone numbers) that may be local to devices located within the UK (+44 country code). A telephony user device initiating communications with the server system can select one of the local addresses to provide at least part of the address for the contact. For example, a telephony user device utilising the local address in 801 will be indicating a partial address 0. This may correspond to the beginning or end, for example, of the address. The remainder of information that needs to be transmitted from the telephony user device to the server system (for example, as tones over a voice channel) can now be a digit shorter.

Figure 8B:
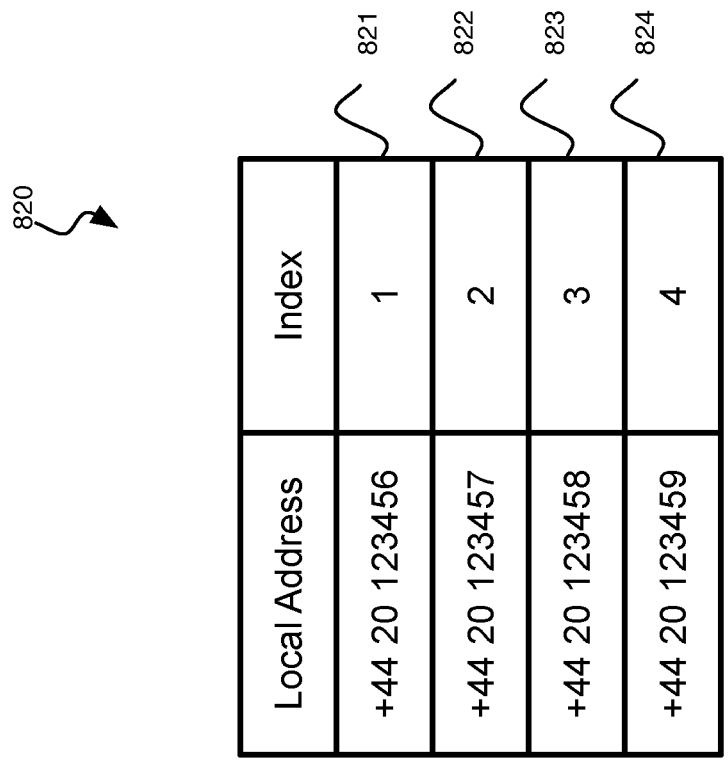
FIG. 8b: shows a table illustrating a local addresses list for use with an embodiment of the invention.

FIG. 8b shows an exemplary list 820 of local addresses for a server system (e.g. 104 or 200) for use with embodiments of the invention.

In some embodiments of the invention, at least a part of the index to the lookup table for an address for a contact may be comprised of selection of one of a plurality of local addresses for the server system.

For example, in FIG. 8b, rows 821 to 824 represent addresses (specifically, telephone numbers) that may be local to devices located within the UK (+44 country code). A telephony user device initiating communications with the server system can select one of the local addresses to provide at least part of the index for the address for the contact. For example, a telephony user device utilising the local address in 821 will be indicating an index number of 1. This corresponds directly to row 701 of FIG. 7. In other embodiments, the index numbers in the table 820 may provide only a portion of the index for the index-address lookup table. For example, where there are 30 addresses for a telephony user device in the lookup table, selection of the address in row 821 could indicate that the address comes from the first ten addresses, and another digit indicating which of those ten could be comprised within the remainder of information transmitted by the telephony user device to the server system (for example, as tones over a voice channel).

Figure 9:
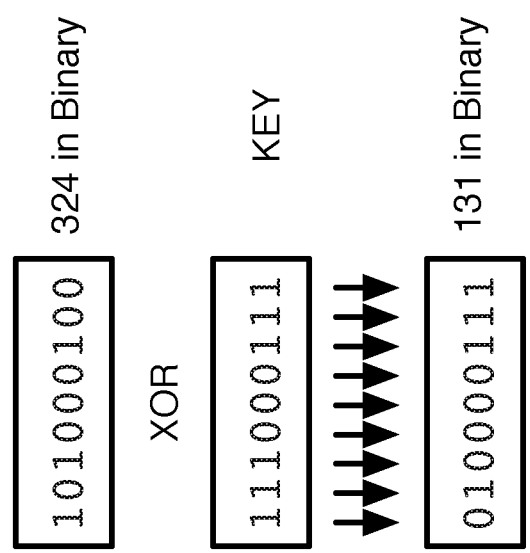
FIG. 9: shows a diagram illustrating an address encryption method in accordance with an embodiment of the invention.

FIG. 9 shows an example of encrypting information for an address in accordance with an embodiment of the invention.

In some embodiments of the invention, the information may comprise either encryption of at least part of the address or at least part of an encrypted address.

For example, a cipher could convert the address into a sequence of digits (e.g. telephone number 123456 encrypted by simple cipher 123 would encrypt into 246579). It will be appreciated by a person skilled in the art that many types of encryption could be used.

In some embodiments of the invention, the telephony user device and the server system may used an incrementing function to encrypt/decrypt the address. For example, transmission of n address by the telephony user device to the server system may be encrypted using n key of a sequential list of keys shared by the telephony user device and the server system; and the server system may then use n key to successfully decrypt the received n address.

FIG. 9 shows a standard XOR function being used to convert an address "324" into an encrypted "131" using key "455".

Figure 10:
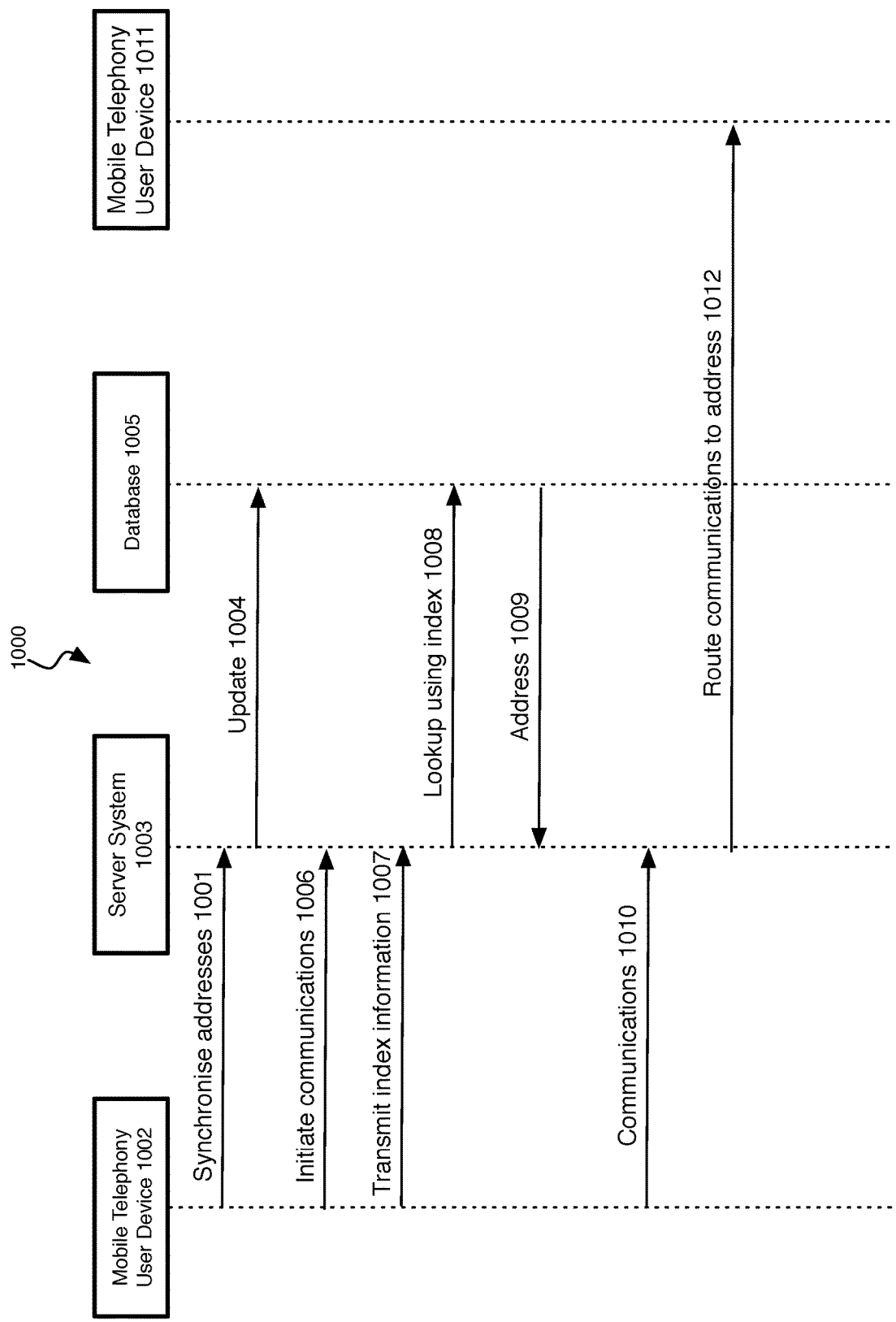
FIG. 10: shows a sequence diagram illustrating a method for routing communications in accordance with an embodiment of the invention.

FIG. 10 shows a sequence diagram 1000 illustrating a communication routing method using a lookup table in accordance with an embodiment of the invention.

In step 1001, a mobile telephony user device 1002 transmits one or more addresses via a side-channel (such as via SMS or an HTTP call) to the server system 1003. The mobile telephony user device 1002 may be synchronising its phonebook/address book with the server system 1003.

In step 1004, the server system 1003 stores the addresses in conjunction with index information within a lookup table at a database 1005. The server system 1003 may be updating previously stored information within the lookup table.

The index information may be transmitted with the addresses in step 1001; the server system 1003 may generate the index information and transmit this back to the mobile telephony user device 1002 via the side-channel for the mobile telephony user device 1002 to store; or the index information may be a hash of the address.

In step 1006, the mobile telephony user device 1002 after receiving initiation of communication with a contact, initiates communication with the server system 1003 using a local address for the server system 1003.

The mobile telephony user device 1002 retrieves stored index information corresponding to the contact address (or generates the index information from the contact address (e.g. via a hash)), and, in step 1007, transmits, at least a part of, this index information to the server system 1003. The mobile telephony user device 1002 may use another part of the index information to select the local address for the server system 1003 from a plurality of local addresses for the server system 1003.

In step 1008, the server system 1003 uses the index information to look up the address for the contact within the lookup table within the database 1005. Where a part of the index information is received, the server system 1003 may reconstitute the index information based upon which local address the mobile telephony user device 1002 initiated communications via.

The address is returned to the server system 1003 in step 1009.

Communications received from the mobile telephony user device 1002 in step 1010 may then be re-routed to the end-point (such as a second telephony user device 1011) corresponding to the retrieved address by the server system 1004 in step 1012.

FIG. 11 shows an address-to-address lookup table 1100 in accordance with an embodiment of the invention.

In some embodiments of the invention, the server system may map the address of a contact to a second address in order to provide the communications action in relation to the contact.

The lookup table may map many originating addresses to one end address (e.g. row 1101 and 1102), or one originating address to many end addresses (e.g. row 1103 and 1104), or many originating addresses to many end addresses. The lookup table may contain chains of addresses (for example, address A may map to address B (e.g. row 1103), and address B may map to address C (e.g. row 1101)). The server system may rely upon a flag for an address to determine whether the address is to be routed communications or not.

Potential advantages of some embodiments of the present invention are that communications can be re-routed while transmitting less information than prior systems during the initiation of communications reducing the time to connect real-time communications such as voice calls; the originating telephony user device can be authenticated using encryption of the address without requiring secret information (such as a PIN) to be provided by the user of the telephony user device during the initiation of communications; re-routing of specific types of communications (such as out of network calls) can occur seamlessly; re-routing of communications can be predefined at the telephony user device and/or at the server system; and communications can be routed to addresses unknown to the originating telephony user device.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A method for routing communications in a telecommunications network comprising a first telephony user device and a server system, including:
at the first telephony user device:
determining a current location of the first telephony user device;
selecting a local address for the server system from a plurality of addresses for the server system based, at least in part, upon the determined current location of the first telephony user device;

receiving instructions to initiate communications with a contact associated with an address;

initiating communications via a channel within the telecommunications network to the selected local address for the server system; and transmitting at least partial index information associated with the contact address to the server system via the telecommunications network after the initiation of the communications, wherein the server system maps the at least partial index information to the contact address and performs a communications action in relation to the contact address at the server system.

2. A method for routing communications in a telecommunications network comprising a first telephony user device and a server system, including:

at the server system:

receiving an initiation of communications from the first telephony user device via a channel within the telecommunications network to a local address for the server system;

receiving at least partial index information associated with an address from the first telephony user device via the telecommunications network after the initiation of the communication;

mapping the at least partial index information to an address associated with a contact; and performing a communications action in relation to the contact using the mapped address;

wherein the first telephony user device determines a current location of the first telephony user device, uses the determined current location to select the local address for the server system from a plurality of addresses for the server system based, at least in part, upon the determined current location of the first telephony user device, and initiates communications with the contact associated with the mapped address.

3. A method as claimed in claim 1, wherein the contact address is one selected from the set of a telephone number, an international and out of network telephone number.

4. A method as claimed in claim 1, wherein the local address is a telephone number.

5. A method as claimed in claim 1, wherein the first telephony user device is a mobile telephony user device.

6. A method as claimed in claim 1, wherein the communications include voice communications and the channel is a voice channel.

7. A method as claimed in claim 1, wherein the instructions are intercepted at the first telephony user device.

8. A method as claimed in claim 7, wherein the instructions comprise the contact address.

9. A method as claimed in claim 7, wherein the instructions are intercepted in dependence upon the contact address.

10. A method as claimed in claim 1, wherein the information is the contact address.

11. A method as claimed in claim 1, wherein the information includes, at least part of, an index to the contact address and wherein the server system uses a lookup to obtain the contact address from a database using the index.

12. A method as claimed in claim 1, wherein at least part of the information is transmitted during the communications initiation.

13. A method as claimed in claim 1, wherein at least part of the information is transmitted via a side-channel to the communications channel.

14. A method as claimed in claim 1, wherein at least part of the information is encoded in the selection of the local address.

15. A method as claimed in claim 1, wherein at least part of the information is encrypted.

16. A method as claimed in claim 1, wherein the communications action includes routing communications from the first telephony user device to a second telephony user device associated with the contact.

17. A method as claimed in claim 16, wherein the routing includes marking the communications as originating from an address associated with the first telephony user device.

18. A method as claimed in claim 16, wherein the second telephony user device has a home network and wherein an originating address is determined based upon the home network of the second telephony user device.

19. A method as claimed in claim 16, further including the second telephony user device initiating communications with the first telephony user device via the telecommunications network using an originating address.

20. A method as claimed in claim 2, further including the server system initiating communications with the first telephony user device to route communications from the first telephony user device to a second telephony user device associated with the contact.

21. A method as claimed in claim 1, wherein the first telephony user device determines the location of the first telephony user device at least in part, by detecting the local network in use by the first telephony user device.

22. A method as claimed in claim 1, wherein the first telephony user device determines the location of the first telephony user device, at least in part, by detecting the network configured for use with the first telephony user device.

23. Electronically readable, non-transitory medium configured to store instructions configured to perform the method of claim 1 when executed on at least one processor.

24. Electronically readable, non-transitory medium configured to store instructions configured to perform the method of claim 2 when executed on at least one processor.

25. A telephony user device configured to perform the method of claim 1.

26. A server system comprising:

at least one processor configured to:

receive an initiation of communications from a first telephony user device via a channel within a telecommunications network to a local address for the server system, receive at least partial index information associated with an address from the first telephony user device via the telecommunications network after the initiation of the communication, map the least partial index information to an address associated with a contact; and perform a communications action in relation to the contact using the mapped address; and at least one communications apparatus;

wherein the first telephony user device is configured to determine a current location of the first telephony user device, use the determined current location to select the local address for the server system from a plurality of addresses for the server system based, at least in part, upon the determined current location of the first telephony user device and initiate communications with the contact associated with the mapped address.

27. A telecommunications network, including:
the server system as claimed in claim 26 and a plurality of telephony user devices configured to communicate with the server system.

28. A method as claimed in claim 1, wherein the at least partial index information is transmitted over the channel.

29. A method as claimed in claim 1, wherein the at least partial index information is transmitted over a voice channel.

30. A method as claimed in claim 1, wherein the current location is determined based on global position system (GPS) information.

31. A method as claimed in claim 1, wherein the at least partial index information is encrypted.

32. A method as claimed in claim 1, wherein the address is mapped to a second address at the server system and the communications action includes initiating communications with the contact via the second address.

33. A method as claimed in claim 1, wherein the at least partial index information includes at least a partial hash of the address.

\* \* \* \* \*